US006931077B2

(12) United States Patent
Aizawa et al.

(10) Patent No.: US 6,931,077 B2
(45) Date of Patent: Aug. 16, 2005

(54) DATA TRANSMITTING APPARATUS AND DATA TRANSMITTING METHOD

(75) Inventors: Junichi Aizawa, Yokohama (JP); Katsuhiko Hiramatsu, Yokosuka (JP); Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 639 days.

(21) Appl. No.: 10/069,005

(22) PCT Filed: Jun. 25, 2001

(86) PCT No.: PCT/JP01/05397

§ 371 (c)(1), (2), (4) Date: Feb. 20, 2002

(87) PCT Pub. No.: WO01/99328

PCT Pub. Date: Dec. 27, 2001

(65) Prior Publication Data

US 2002/0114404 A1 Aug. 22, 2002

(30) Foreign Application Priority Data

Jun. 23, 2000 (JP) ........................................ 2000-190229

(51) Int. Cl.[7] .............................................. H04L 27/04
(52) U.S. Cl. ......................... 375/295; 455/522; 455/69; 714/748; 714/800
(58) Field of Search ................................. 375/295, 297; 455/69, 522; 714/748, 749, 750, 800

(56) References Cited

U.S. PATENT DOCUMENTS 6,101,168 A * 8/2000 Chen et al. ................. 370/228

| | | | |
|---|---|---|---|
| 6,606,503 B2 * | 8/2003 | Ozluturk et al. | 455/522 |
| 2001/0011023 A1 * | 8/2001 | Nishioka et al. | 455/522 |
| 2001/0023189 A1 * | 9/2001 | Kajimura | 455/522 |
| 2001/0046877 A1 * | 11/2001 | Ohkubo et al. | 455/522 |
| 2002/0060997 A1 * | 5/2002 | Hwang | 370/335 |
| 2002/0196812 A1 * | 12/2002 | Yamaguchi et al. | 370/474 |

FOREIGN PATENT DOCUMENTS

| JP | 05160777 | 6/1993 |
|---|---|---|
| JP | 09312629 | 12/1997 |
| JP | 11017646 | 1/1999 |
| JP | 2000004196 | 1/2000 |

OTHER PUBLICATIONS

International Search Report dated Aug. 21, 2001.
T. Niinomi, et al.; "Selective Repeat Type–II Hybrid ARQ/FEC Scheme Using Rate–Compatible Punctured Convolutional Code", Communications, (1990), ICC '90, Including Supercomm Technical Sessions, SUPERCOMM/ICC '90, Conference Record, IEEE International Conference on, (1990), vol. 3, pp. 1251–1255.

* cited by examiner

Primary Examiner—Temesghen Ghebretinsae
(74) Attorney, Agent, or Firm—Stevens, Davis, Miller & Mosher, LLP

(57) ABSTRACT

A parity bit generating section 110 generates parity bits of FEC for error correction from transmission data. A transmission power deciding section 111 decides transmission power at the time of retransmitting the parity bits from the number of information bits of transmission data and the number of parity bits. A transmission power controller 112 controls transmission power based on information decided by the transmission power deciding section 111 and outputs the resultant to a radio transmission section 104.

7 Claims, 3 Drawing Sheets

DATA TRANSMITTING APPARATUS AND DATA TRANSMITTING METHOD

TECHNICAL FIELD

The present invention relates to a data transmitting apparatus and a data transmitting method suitable for use in a communication terminal apparatus and a base station apparatus of a mobile communication system.

BACKGROUND ART

As an error correcting method in data transmission, for example, there is a method called a type II hybrid ARQ method (Shuichi Sasaoka: Mobile Communications, page 240, Ohmsha,Ltd). In this error correcting method, only information bits are first transmitted, and then when it is necessary to perform retransmission with respect to the transmission (namely, when a receiving side cannot demodulate the information bits correctly), only parity bits (redundant bits) of FEC (Forward Error Correction) for error correction are retransmitted. The receiving side performs error correction using information bits previously received and the parity bits that have just received.

In the conventional data transmitting method, however, the transmission of information bits and the retransmission of parity bits are performed with the same power, causing a problem in which interference, which is equivalent to or more than interference caused at the time of transmitting information bits, will be given to other users at the time of retransmitting the parity bits. In particular, since the number of parity bits is generally smaller than that of information bits, transmission power per parity bit becomes higher than transmission power per information bit when transmission of information bits and that of parity bits are performed with the same power. This results in that the parity bits are retransmitted with transmission power more than necessary, thereby causing the aforementioned problem.

As a more specific explanation, for example, if information bits are transmitted with power P where the number of information bits is 1000 and that of parity bits is 10, power per bit becomes P/1000. Also, if the retransmission of parity bits is performed with the same power P, power per bit becomes P/10, resulting in an increase of transmission power as compared with information bits. In this way, in a case where transmission is performed with the same power P, power per bit of parity bits becomes higher than that of information bits, increasing in a possibility that interference, which is equivalent to or more than interference caused at the time of transmitting information bits, will be given to other users at the time of retransmitting the parity bits. Additionally, this problem occurs not only in the type II hybrid ARQ method but also in all methods in which the same power is used at the transmission data transmitting and retransmitting time.

DISCLOSURE OF INVENTION

It is an object of the present invention to provide a data transmitting apparatus and a data transmitting method that are capable of restraining interference with other users to a minimum at the time of retransmitting transmission data.

This object can be achieved by controlling transmission power at the time of retransmitting data after transmitting the data.

BEST MODE FOR CARRYING OUT THE INVENTION

The following will specifically explain the best mode for carrying out the invention with reference to the drawings accompanying herewith.

(Embodiment 1)

Figure 1:
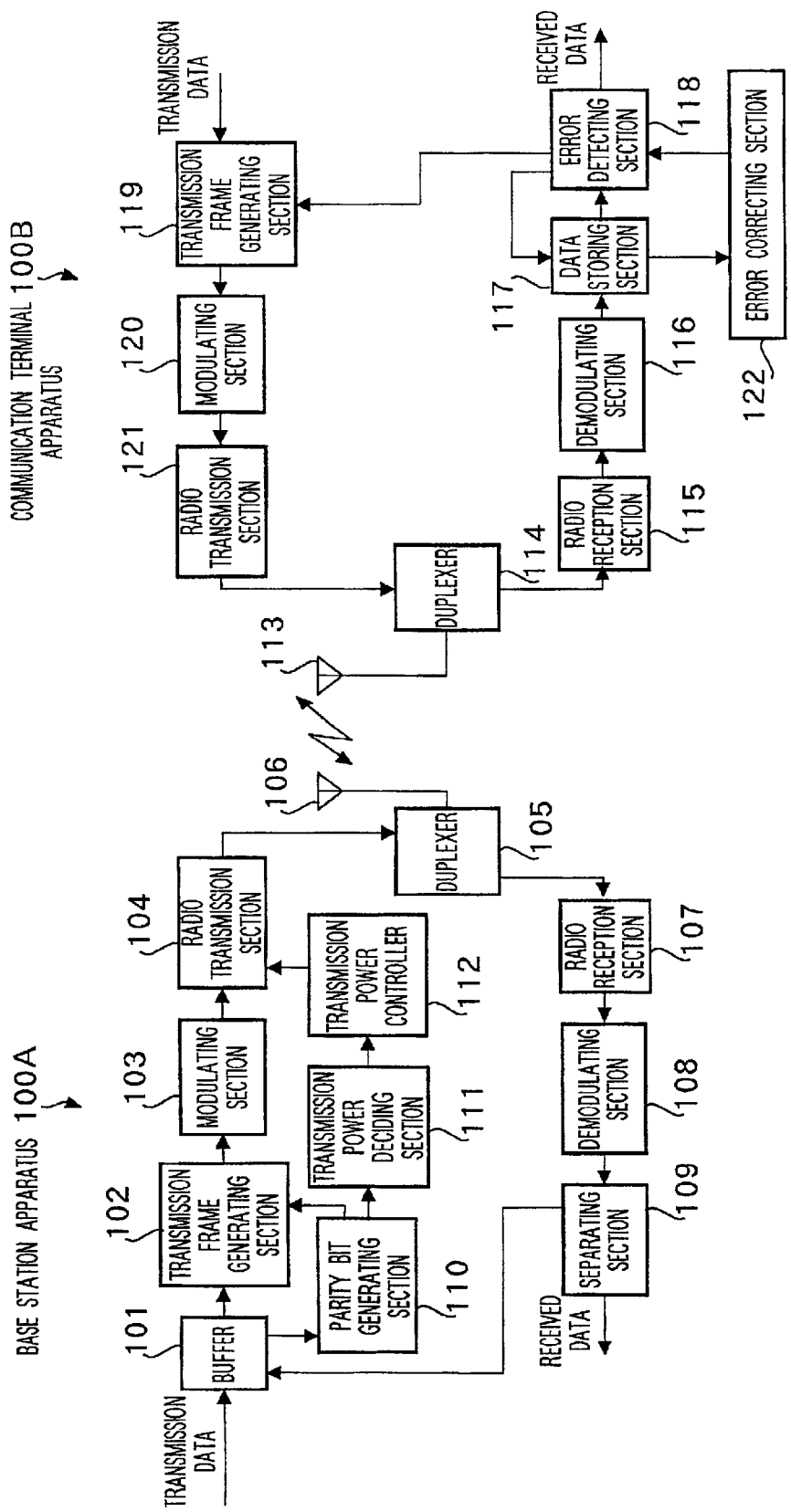
FIG. 1 is a block diagram showing each of a base station apparatus and a communication terminal apparatus according to Embodiment 1 of the present invention.

FIG. 1 is a block diagram showing each of a base station apparatus and a communication terminal apparatus according to Embodiment 1 of the present invention.

In FIG. 1, a base station apparatus 100A comprises a buffer 101 for temporarily storing transmission data, a transmission frame generating section 102 for generating a transmission frame, a modulating section 103 for modulating the transmission frame generated by the transmission frame generating section 102 so as to generate a modulated signal, a radio transmission section 104 for amplifying the modulated signal generated by the modulating section 103 up to power with a predetermined level so as to output the resultant, a duplexer 105 for assigning an antenna 106 to a transmission system or reception system, antenna 106, a radio reception section 107 for receiving a radio signal captured by the antenna 106 so as to output a modulated signal, a demodulating section 108 for demodulating the demodulated signal received by the radio reception section 107, a separating section 109 for separating reception data, and a transmission request signal that is called an ACK (Acknowledgement) signal or a retransmission request signal that is called a NACK (Negative Acknowledgment) signal from the signal demodulated by the demodulating section 108, a parity bit generating section 110 for generating parity bits (redundant bits) of an error correcting code (FEC: Forward Error Correction) for error correction from transmission data, a transmission power deciding section 111 for deciding transmission power at a parity bit retransmitting time from the number of information bits of transmission data and that of parity bits, and a transmission power controller 112 for controlling the radio transmission section 104 so as to obtain transmission power decided by the transmission power deciding section 111.

Additionally, the radio transmission section 104 corresponds to transmitting means. Moreover, the transmission power deciding section 111 and transmission power controller 112 configure transmission power controlling means.

On the other hand, a communication terminal apparatus 100B comprises an antenna 113, a duplexer 114 for assigning the antenna 113 to a transmission system or a reception system, a radio reception section 115 for receiving a radio signal captured by the antenna 113 so as to output a modulated signal, a demodulating section 116 for demodulating data from the modulated signal output from the radio reception section 115, a data storing section 117 for storing data demodulated by the demodulating section 116, an error detecting section 118 for detecting data stored by the data storing section 117 and an error of data error corrected by an error correcting section 122, transmission frame generating section 119 for generating a transmission frame from transmission data, and an ACK signal or NACK signal, a modulating section 120 for modulating the transmission frame generated by the transmission frame generating section 119 so as to generate a modulated signal, a radio transmission section 121 for amplifying the modulated signal from the modulating section 120 up to power with a predetermined level so as to output the resultant, and the error correcting section 122 for correcting an error of data stored by the data storing section 117.

In the base station apparatus 100A, after input transmission data is stored in buffer 101, the transmission data is not subjected to error correcting coding, and a transmission frame is generated only using the transmission data in transmission frame generating section 102.

The generated transmission frame is modulated by the modulating section 103, the resultant is amplified up to power with a predetermined level by the radio transmission section 104, and the radio signal is transmitted from the antenna 106 via the duplexer 105.

In the communication terminal apparatus 100B, a radio signal captured by the antenna 113 is received by the radio reception section 115 via the duplexer 114 so as to output a modulated signal. The modulated signal output from the radio reception section 115 is demodulated by the demodulating section 116 and the resultant is stored in the data storing section 117. Data stored in the data storing section 117 is subjected to error detection by the error detecting section 118. In a case where there is an error in the data stored in the data storing section 117, a NACK signal is input to the transmission frame generating section 119 from the error detecting section 118. The transmission frame generating section 119 generates a transmission frame from the input NACK signal and transmission data. The transmission frame generated by the transmission frame generating section 119 is modulated by the modulating section 120, the resultant is amplified up to power with a predetermined level by the radio transmission section 121, and the radio signal is transmitted from the antenna 113 via the duplexer 114.

In the base station apparatus 100A, a radio signal captured by the antenna 106 is received by the radio reception section 107 via the duplexer 105, and a modulated signal is output from the section 107. The modulated signal output from the radio reception section 107 is demodulated by the demodulating section 108. Demodulated data is input to the separating section 109 to be separated into received data and NACK signal, and received data is output directly and NACK signal is input to the buffer 101. When the NACK signal is input to the buffer 101, the transmission data stored in the buffer 101 is input to the parity bit generating section 110. Then, a parity bit of error correcting code for error correction is generated from the transmission data by the parity bit generating section 110, and the resultant is input to the transmission frame generating section 102.

Moreover, the number of information bits for the transmission data and that of parity bits are input to the transmission power deciding section 111 so as to decide transmission power at the parity bit retransmitting time from these numbers of bits. For example, it is assumed that the number of information bits for transmission data is set to "1000", the number of parity bits is set to "10", and transmission data is sent with power P. Power per information bit results in P/1000. In retranslating the parity bit, the power is decided to P/100 so that power per bit is the same in the parity bit and transmission data. Thus, a ratio of the power of transmission data to the power of parity bit is made the same as a ratio of the number of information bits to the number of parity bits (namely, transmission power per bit is made the same as each other).

Transmission power information decided by the transmission power deciding section 111 is input to the transmission power controller 112. The transmission power controller 112 controls transmission power of the radio transmission section 104 based on input transmission power information. While, the parity bits generated by the parity bit generating section 110 are input to the transmission frame generating section 102 so as to generate a transmission frame. The generated transmission frame is modulated by the modulating section 103 and the resultant is input to the radio transmission section 104. The modulated signal input to the radio transmission section 104 is transmitted with transmission power controlled by the transmission power controller 112 from the antenna 106 via the duplexer 105.

In the communication terminal apparatus 100B, when the parity bits retransmitted from the base station apparatus 100A are received, data stored in the data storing section 117 and the parity bits are input to the error correcting section 122 and error correction is provided thereto. Data subjected to error correction is input to the error detecting section 118 and error detection is provided thereto. A series of operations is repeated until no error is detected by the error detecting section 118, and when no error is detected, data subjected to error correction is output as received data, while the content of data storing section 117 is reset. Then, an ACK signal for requesting next data transmission is input to the transmission frame generating section 119 from the error detecting section 118 so as to generate a transmission frame together with data transmission.

In the base station apparatus 100A, when the ACK signal is received, it is input to the buffer 101 and the content of the buffer is reset. Resultantly, transmission of next data is started.

Figure 2:
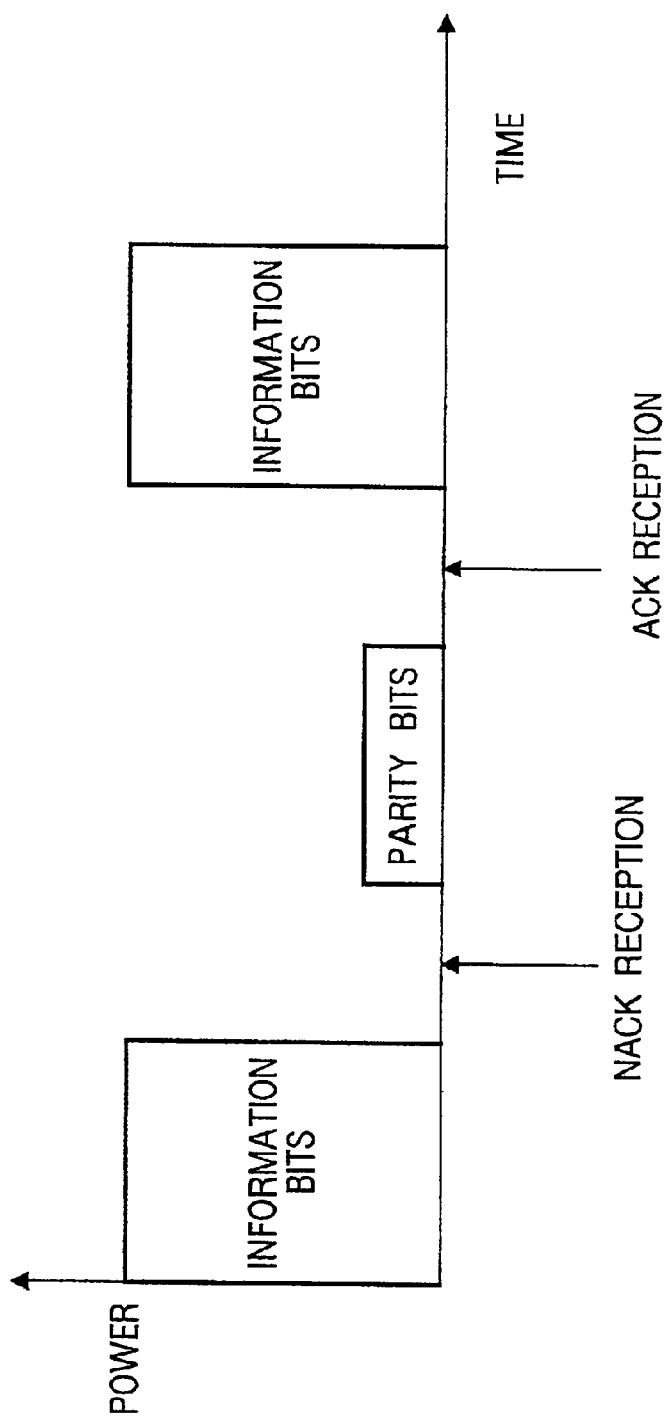
FIG. 2 is a view explaining data transmission in the base station apparatus according to Embodiment 1 of the present invention.

FIG. 2 illustrates a difference in power between information bits and parity bits.

When a NACK signal is received after transmitting information bits, transmission power for parity bits is decided and the parity bits are transmitted with the decided power. Additionally, in this case, it is assumed that the number of parity bits is smaller than that of information bits. When an ACK signal is received after transmitting the parity bits, next information bits are transmitted with the same power as that of the previous information bits (or power decided by transmission power control).

Thus, according to this embodiment, in a case where a need for retransmitting transmission data arises and only parity bits of error correcting code for error correction are transmitted, transmission power of parity bits is set to be lower than that of data transmission, so that interference with other users caused by transmission of parity bits can be restrained to a low level.

Additionally, in this embodiment, the base station apparatus 100A and communication terminal apparatus 100B may be reversed each other. In other words, 100A and 100B may be used as the communication terminal apparatus and base station apparatus, respectively.

(Embodiment 2)

Figure 3:
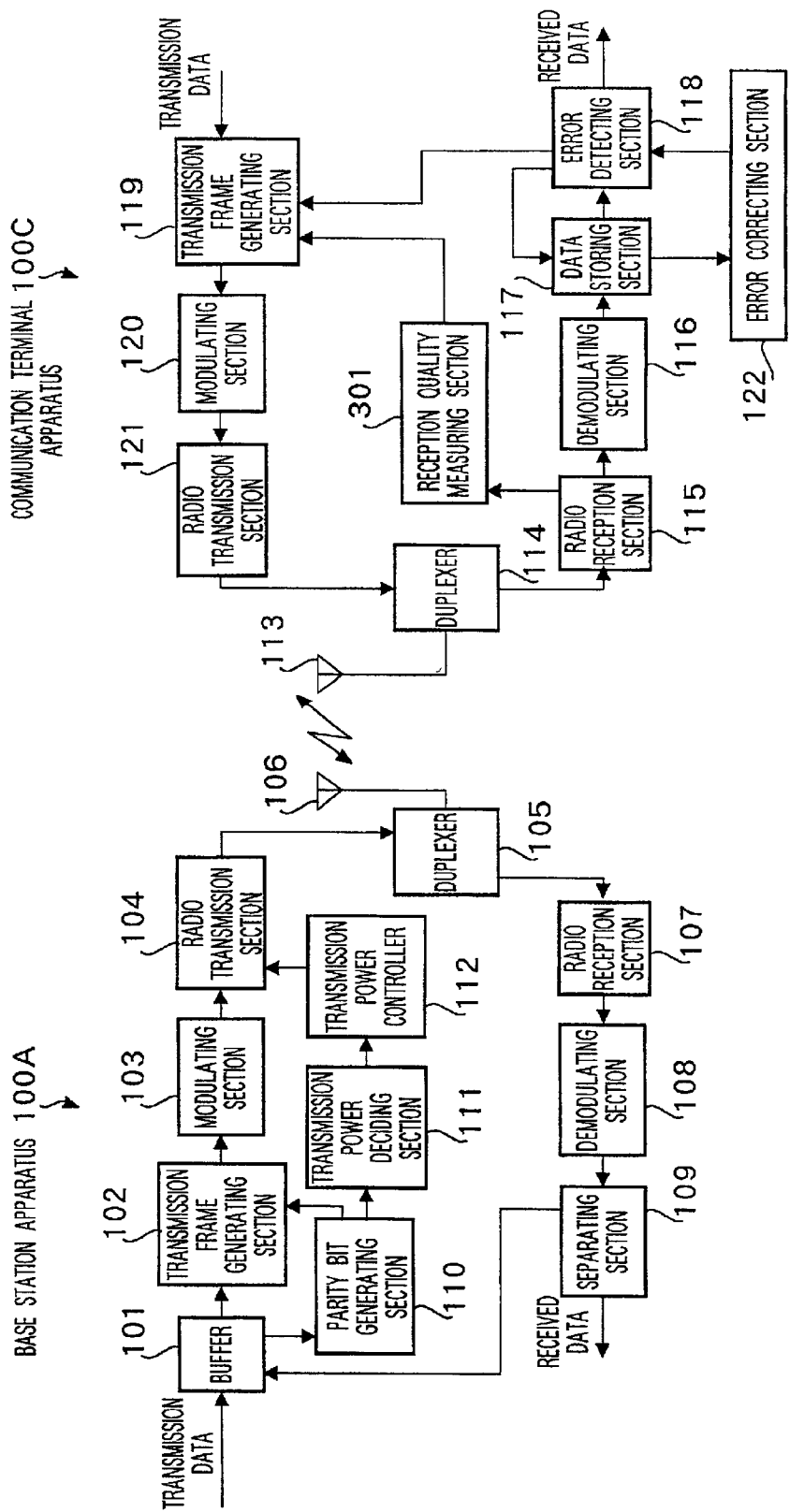
FIG. 3 is a block diagram showing each of a base station apparatus and a communication terminal apparatus according to Embodiment 2 of the present invention.

FIG. 3 is a block diagram showing each of a base station apparatus and a communication terminal apparatus according to Embodiment 2 of the present invention. In this figure, parts identical to those in FIG. 1 are assigned the same codes as in FIG. 1 and their detailed explanations are omitted.

Though the aforementioned Embodiment 1 decides the power ratio between transmission data and parity bits, as a transmission power deciding method at the time of retransmitting the parity bits of FEC, based on the ratio between the number of information bits of transmission data and that of parity bits, Embodiment 2 decides it based on reception quality information in addition to the ratio between the number of information bits of transmission data and that of parity bits.

In a communication terminal apparatus 100C, a modulated signal received by the radio reception section 115 is demodulated by the demodulating section 116 and reception quality is measured by a reception quality measuring section (reception quality measuring means) 301. Data demodulated by the demodulating section 116 is stored in the data storing section 117. Meanwhile, reception quality information measured by the reception quality measuring section 301 is input to the transmission frame generating section 119, and a transmission frame is generated together with an ACK signal or NACK signal and transmission data.

On the other hand, in the base station apparatus 100A, a modulated signal received by the radio reception section 107 is demodulated by the demodulating section 108. Data demodulated by the demodulating section 108 is separated into received data, and an ACK signal or NACK signal and reception quality information. The received data separated is output directly, and ACK signal or NACK signal is input to the buffer 101, and reception quality information is input to the transmission power deciding section 111.

The transmission power deciding section 111 decides transmission power using the reception quality information. For example, even if transmission power is decided in the same way as that of the aforementioned Embodiment 1, power higher than decided transmission power is set when reception quality is poor from reception quality information, and power smaller than decided transmission power is set when reception quality is good. It is thereby possible to decrease a probability that errors will occur in parity bits when reception quality is poor, and to reduce interference with other users by lowering power when reception quality is good.

Additionally, in this embodiment, the base station apparatus 100A and communication terminal apparatus 100C may be reversed each other. In other words, 100A and 100C may be used as the communication terminal apparatus and base station apparatus, respectively.

Moreover, in the aforementioned Embodiments 1 and 2, the transmission power is controlled so that the transmission power per bit is the same in transmitting transmission data and parity bits. However, it is not necessary to make the transmission power per bit the same always. For example, transmission power of parity bits may be increased or decreased as compared with the ratio between the number of information bits of transmission data and that of parity bits. In this case, if transmission power of parity bits per bit is high, error correction ability increases but interference with other users becomes greater. Conversely, if transmission power of parity bits per bit is low, interference with other users becomes smaller but error correction ability decreases.

Further, transmission power may be increased with respect to data whose delay in retransmission is not permitted, and decreased with respect to data whose delay in retransmission is permitted. Transmission power may be appropriately changed with consideration given to these points.

Furthermore, in the aforementioned Embodiments 1 and 2 both ACK and NACK signals are sent back. However, it is not necessary to send back the NACK signal always. For example, when such a system is used that data is retransmitted unless ACK signal comes within a predetermined time after transmitting data, it is not unnecessary to send back the NACK signal.

Still furthermore, in the aforementioned Embodiments 1 and 2, the first transmission is limited to information bits subjected to no error correction and retransmission is limited to the parity bits. However, it may be possible to transmit information bits and parity bits in the first transmission and/or in the retransmission.

As explained above, according to the present invention, interference with other users can be restrained to a minimum at the time of retransmitting transmission data to make it possible to implement good communications.

This application is based on the Japanese Patent Application No. 2000-190229 filed on Jun. 23, 2000, entire content of which is expressly incorporated by reference herein.

INDUSTRIAL APPLICABILITY

The present invention is suitable for use in a communication terminal apparatus and a base station apparatus of a mobile communication system.

What is claimed is:

1. A data transmitting apparatus comprising:
   a transmitting section that amplifies a modulated signal, obtained by modulating transmission data, up to power with a predetermined level so as to transmit the amplified signal; and
   a transmission power controlling section that controls transmission power at a time of re-transmitting said transmission data, wherein:
   said transmission power controlling section decides the transmission power of parity bits based on a ratio of the number of information bits to the number of parity bits when said parity bits for error correction are transmitted at the transmission data re-transmitting time.

2. The data transmitting apparatus of claim 1, wherein said transmission power controlling section uses reception quality information, sent from an apparatus receiving the transmitted transmission data, in connection with the modulated signal transmitted from the data transmitting apparatus at the time of deciding the transmission power of parity bits.

3. The data transmitting apparatus of claim 2, wherein:
   said transmission power controlling section decides the transmission power of parity bits according to the reception quality information, increases said transmission power when the reception quality is poor, and decreases said transmission power when the reception quality is good.

4. A data transmitting apparatus comprising:
   a transmitting section that amplifies a modulated signal, obtained by modulating transmission data, up to power with a predetermined level so as to transmit the amplified signal; and
   a transmission power controlling section that controls transmission power at a time of re-transmitting said transmission data, wherein:
   said transmission power controlling section decides the transmission power of parity bits such that a ratio of the transmission power of information bits to the power of parity bits and a ratio of the number of information bits to the number of parity bits become the same value when said parity bits for error correction are transmitted at the transmission data re-transmitting time.

5. The data transmitting apparatus of claim 4, wherein said transmission power controlling section uses reception quality information, sent from an apparatus receiving the transmitted transmission data, in connection with the modulated signal transmitted from the data transmitting apparatus at the time of deciding the transmission power of parity bits.

6. The data transmitting apparatus of claim 5, wherein:
said transmission power controlling section decides the transmission power of parity bits according to the reception quality information, increases said transmission power when the reception quality is poor, and decreases said transmission power when the reception quality is good.

7. A base station apparatus comprising the data transmitting apparatus of claim 1.

* * * * *